Figure 1:
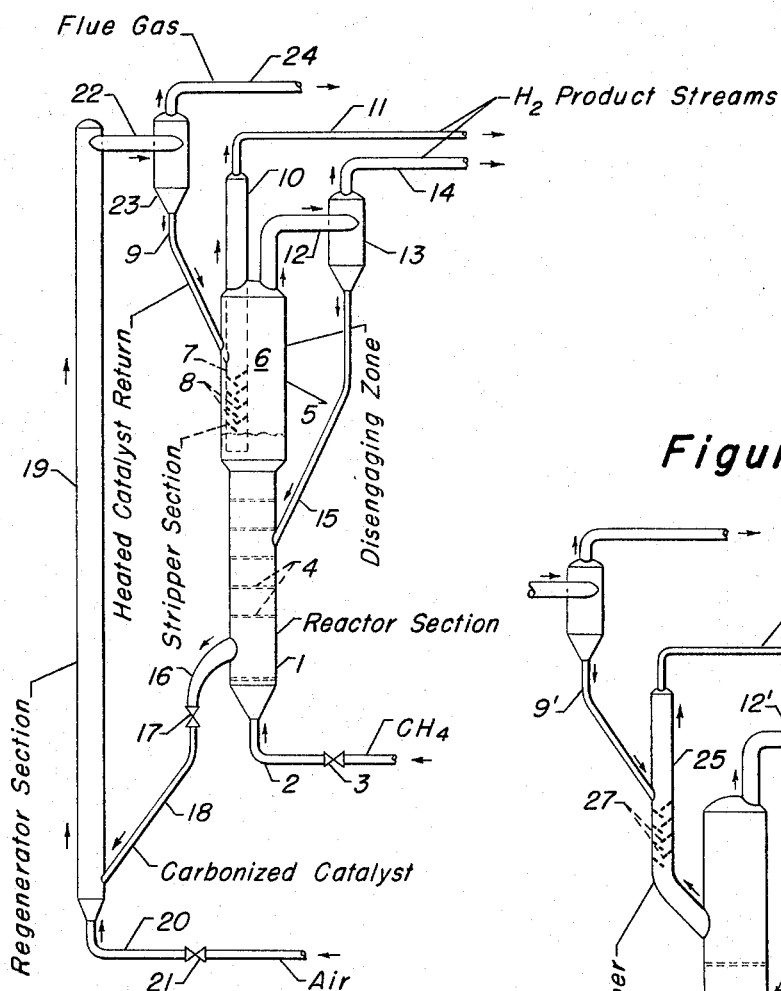

Nov. 8, 1966 J. B. POHLENZ ETAL 3,284,161
METHOD FOR HYDROGEN PRODUCTION BY CATALYTIC DECOMPOSITION
OF A GASEOUS HYDROCARBON STREAM
Filed Jan. 22, 1963

INVENTORS:
Jack B. Pohlenz
Norman H. Scott
BY:
James R. Hoatson Jr.
Philip T. Liggett
ATTORNEYS

United States Patent Office 3,284,161
Patented Nov. 8, 1966

3,284,161
METHOD FOR HYDROGEN PRODUCTION BY CATALYTIC DECOMPOSITION OF A GASEOUS HYDROCARBON STREAM
Jack B. Pohlenz, Arlington Heights, and Norman H. Scott, Villa Park, Ill., assignors to Universal Oil Products Company, Des Plaines, Ill., a corporation of Delaware
Filed Jan. 22, 1963, Ser. No. 253,085
2 Claims. (Cl. 23—212)

The present invention relates to an improved system for hydrogen production in a catalytic decomposition of a hydrocarbon stream and more specifically to an improved flow and apparatus arrangement providing countercurrent flow of descending catalyst particles and a rising gaseous hydrocarbon stream in the conversion zone, while the regeneration step is carried out in a dilute phase rising columnar flow discharging particles at an elevation above a catalytic stripping zone at the upper end of the hydrocarbon conversion zone.

Fluidized or moving bed catalytic conversion systems for decomposing a light hydrocarbon stream, such as methane, utilize substantially different operating conditions than those encountered in the catalytic cracking of gas-oil streams to produce improved gasoline yields. By way of contrast, the hydrocarbon stream is decomposed with no side reactions and at very high conversions per pass to produce hydrogen and carbon, even in the presence of a catalyst, at substantially higher temperatures than in catalytic cracking, as, for example, above 1200° F. or more generally in the range of 1500° F. to 2000° F. or higher. The regeneration step is also generally carried out under more closely controlled oxygen content conditions than in catalytic cracking in order to maintain a carbon monoxide rich flue gas stream and a regulated carbon level on the catalyst particles being returned to the reaction zone. Still other operating conditions for improved hydrogen production in a moving bed or fluidized system have been determined and are currently being discovered. For instance in the catalytic cracking of gas-oil, it is customary to strip the contacted catalyst particles being withdrawn from the reaction zone in order to remove occluded hydrocarbon therefrom prior to their entry into the regeneration zone. While conversely, for improved hydrogen production, the stripping and reducing of the regenerated and reheated catalyst particles is carried out prior to the particles being introduced into the reaction zone. This minimizes the transfer of carbon oxides as well as a catalyst in the oxidized state. A highly oxidized catalyst tends to produce excessive quantities of carbon oxides within the reaction zone and affect hydrogen conversion and purity.

In view of the advantages obtained by stripping and reducing regenerated catalyst particles, it is an object of the present invention to provide an improved flow in a special system having the reaction zone integrated with a superposed stripping zone such that a portion of the hydrogen product stream may be permitted to rise and flow into the stripping section countercurrently to descending partially and/or completely oxidized and heated catalyst particles from the regeneration zone. There is thus effected a desired treatment for the particles with a reducing atmosphere prior to their descent through the reaction zone countercurrently to the rising hydrocarbon reactant stream.

It has also been found that higher conversions and hydrogen yields may be obtained where an adequate quantity of catalyst is maintained within the reaction zone, i.e., whereby the operation does not involve an unduly high space velocity. Thus, it is also an object of the present improved system to provide a design and arrangement providing multiple stage contacting in the reaction zone, with means therein to effect the redistribution of the descending particles through a rising hydrocarbon stream.

By virtue of the use of redistribution plates or grid members in both the stripping and reaction zones, there is provided a break-up of any gas bubbles or channeled streams, as well as the break-up and redistribution of the descending particle flow. There is thus improved contacting and conversion as compared to systems utilizing conventional hindered settling in dense phase beds or to a light phase contact and overhead transfer having the reactant stream and particles move concurrently through the contact zone.

It may be further pointed out that the present improved flow system, which is particularly adapted and arranged to effect the catalytic decomposition of hydrocarbons to hydrogen and coke, permits maximizing pressure within the conversion zone while at the same time providing for minimizing pressure within the regeneration zone, to reduce air compression costs. Still further the arrangement permits varying the size of catalyst to be involved in effecting the catalytic conversion. Generally, the catalyst particles will be relatively fine, such as utilized in conventional fluidized systems inasmuch as there is a fluidized contact and lift to the particles through a vertically elongated zone; however, relatively large particles which can be subjected to a normal air lift type of operation may be utilized in the present system, particularly since gravity flow is utilized through the stripping and reactor sections of the unit, with such particles moving downwardly countercurrently to a gaseous hydrocarbon stream.

In one embodiment, the present improved invention provides a continuous method for converting a hydrocarbon stream into hydrogen in the presence of subdivided catalyst particles in a manner which comprises, introducing heated and stripped catalyst particles to the upper end of a vertically elongated reaction zone and passing such particles downwardly therethrough countercurrently to a hydrocarbon charge stream being introduced to the lower end of such zone at decomposition conditions effecting the production of a hydrogen containing stream and carbonized particles, passing resulting carbon containing particles to the lower end of a regeneration zone and contacting them in a rising fluidized column with a regeneration stream containing free oxygen in a controlled quantity whereby to effect the burning and removal of at least a portion of the carbon content on such particles, discharging resulting heated particles and flue gas from the upper end of said regeneration zone and effecting the separation thereof at an elevation above said reaction zone, passing separated particles by gravity flow downwardly through a stripping zone concurrently to a stripping stream comprising at least a portion of the hydrogen containing product stream rising from said reaction zone whereby to effect the removal of carbon oxides from such particles, subsequently passing stripped catalyst particles downwardly in further gravity flow from the lower end of said stripping zone to the upper end portion of said reaction zone which is in open communication therewith for downward flow countercurrently through the hydrocarbon charge stream as aforesaid, and separately withdrawing resulting hydrogen containing product streams from both the upper end of said reaction zone and the upper end of said stripping zone.

In view of the improved hydrocarbon conversion and hydrogen yields which may be obtained by maintaining a controlled space velocity through the reaction section of the unit, a preferred conversion section utilizes a plurality of vertically superimposed grid members to effect redistribution and optimum contact between the descending particles and a rising reactant stream. A prolonged residence time of the hydrocarbon stream in contact with a solid catalyst particle being in the direction of optimum yields. It is also an advantage to have the hottest catalyst particles, in the countercurrent flow, at the upper end of the conversion zone where they contact the hydrogen rich effluent stream and effect the maximum conversion of unconverted hydrocarbons in such stream.

The integration of the stripping zone with the upper end portion of the reaction zone is a particularly advantageous feature which is applicable to hydrogen production and, of course, inapplicable to gas-oil cracking, in that at least a portion of the hydrogen rich stream may readily be diverted for use as a stripping stream to effect the removal of carbon oxides and reduction of heated catalyst particles passing from the oxidizing regeneration zone. In conventional stripping, as effected in cracking units or even in connection with other forms of hydrogen producing units, it is customary to use steam or nitrogen or other relatively inert mediums for stripping of the catalyst particles. Such conventional mediums may efficiently remove carbon oxides but will not provide the desired reducing treatment of catalyst in a highly oxidized state as it leaves the regeneration zone. A preferred form of stripping section in the present improved system will utilize side to side plates or other redistribution plates in order to effect an efficient contact between the descending particles and the rising stripping stream. At the same time redistribution plates are of advantage in permitting multiple stage conversion and redistribution of the particles, with a "squeezing out" of entrained gas as the particles descend in the multiple stage gravity flow. The stripping section may be incorporated internally within the upper end portion of the reaction or conversion section, or alternatively, the stripping section may be designed and arranged to be external of the reaction section but joined therewith at its lower end such that the particles freely flow into the reaction zone while at the same time a portion of the hydrogen rich product stream is permitted to flow upwardly into the lower end of the stripping section as the principal stripping medium. A preferred design also provides a gas-particle disengaging space in, respectively, the upper end of the reaction section and the upper portion of the stripping section such that a minimum quantity of catalyst particles are entrained with the gaseous stream passing overhead from the conversion and stripping sections.

Reference to the accompanying drawing and the following description will serve to better clarify the improved flow system and the advantage obtained in connection therewith.

FIGURE 1 of the drawing indicates diagrammatically a conversion unit or system utilizing upward dilute phase contacting in a vertically elongated regeneration zone and a descending gravity flow of particles in the reactor and stripping sections.

Figure 2:
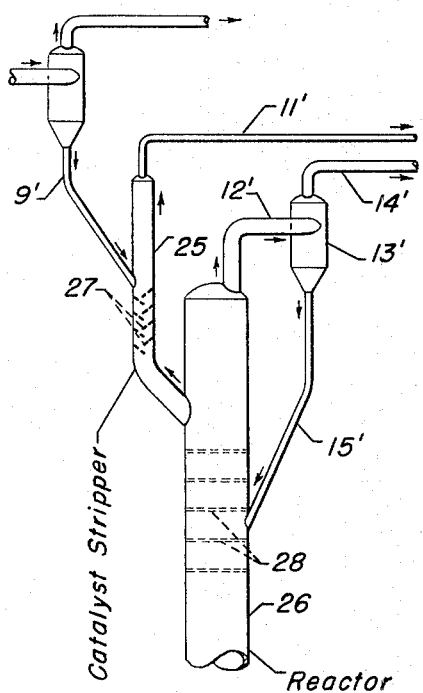

FIGURE 2 of the drawing indicates diagrammatically a modification of the catalyst stripper design and arrangement with respect to the upper end portion of the reactor, such that the stripper is entirely external of the reactor section.

Referring now particularly to FIGURE 1 of the drawing, there is shown a reactor chamber 1 and a lower inlet line 2 having a control valve 3 adapted to receive a hydrocrabon charge stream such as methane, whereby such stream may be catalytically decomposed in accordance with the formula $CH_4 \rightarrow 2H_2 + C$. The gaseous hydrocarbon stream rises vertically through reactor 1 countercurrently and in fluidized contact with catalyst particles descending by gravity from the upper end of the chamber. The present embodiment indicates a plurality of superimposed perforate plates or grids 4 throughout the height of the reactor chamber 1 such that there is a multiple stage redistribution of descending particles together with breaking up of any channeling or bubbles in the rising gas stream and an efficient countercurrent contacting for optimum conversion to hydrogen. The upper end of the reactor 1 is provided with an enlarged section 5 providing an internal enlongated disengaging zone 6 as well as room for an internal vertical elongated stripper 7. The latter is provided with a plurality of side to side plates 8 to also give multiple stage contacting in the stripper section. Heated and regenerated catalyst particles enter the upper or intermediate portion of the stripper 7 from a transfer line 9 such that they pass in a descending gravity flow over plates 8 and counterconcurrently to a rising hydrogen rich product stream entering an open lower end portion of stripper section 7 from the top of the reactor 1. The resulting stripped and substantially reduced particles thus enter the reactor 1 for a descending countercurrent flow therein as above described. At the upper end of the unit, a stripping gas stream with entrained carbon oxides is discharged from an upper disengaging section 10 and transfer line 11. At the same time the major portion of the hydrogen rich product stream at the top of reactor section 1 passes through the upper disengaging zone 6 to transfer line 12. The latter connects with a particle separator 13 whereby there is a substantially particle free hydrogen stream discharged through line 14 and catalyst particles returned by way of line 15 to the reactor 1.

In both the stripper and reactor sections there is ob-multiple stage contacting between the particles and the rising gaseous stream. The side to side plates 8 in the stripper effect a multiple stage squeezing out of occluded carbon oxides by the multiple collections and distributions and the recontacting of the rising stripping portion of the hydrogen product stream, whereby resulting stripped and substantially reduced hot catalyst enters the upper end of the reaction section. The superimposed grids 4 in the reaction section similarly effect the redistribution of descending catalyst particles with a redistributed rising reactant stream such that there is an efficient conversion of the latter to hydrogen and carbon. The countercurrent flow is also of advantage in readily maintaining a sufficient quantity of catalyst in the reaction zone for a reduced space velocity and efficient conversion, particularly as compared with a high velocity dilute phase rising column contact where the particles and the reactant stream flow concurrently. For example, in a pilot plant test operation utilizing a concurrent flow of catalyst particles and a methane reactant stream through a one inch pipe size reaction zone at a feed rate of 110 standard cubic feet per hour and at a conversion temperature of approximately 1550° F. there was effected an 86% conversion of methane to hydrogen and carbon. Subsequent tests utilizing a one and one-half inch pipe size reactor zone, such that the internal volume was substantially doubled, there was provided a 91.5% conversion for a similar feed rate to the reactor zone by virtue of the lower space velocity and greater volume of catalyst in the reaction zone. Actually, it was determined that the feed rate could be substantially doubled so as to provide 200–250 standard cubic feet per hour at a reactor temperature of 1550° F. and effect conversions equivalent to those in the one inch diameter pipe size reactor.

In the present improved system, contacted catalyst particles containing carbon deposition are withdrawn from the lower end of reactor 1 by way of outlet section 16, control valve 17, and transfer conduit 18. The latter connects with the lower end of the regenerator chamber 19 such that the carbonized particles may be contacted with air introduced through line 20 and control valve 21 for a fluidized up-flow columnar contact. Resulting heated particles with a reduced carbon content are passed from the elongated regeneration section 19 through an upper transfer line 22 and particle separator 23. The latter serves to separate the catalyst particles from the flue gas stream which may be discharged by way of line 24 while the particles descend through a transfer line 9 to the stripper section 7 as hereinbefore described. The regeneration operation is preferably carried out under controlled oxidation conditions to preclude excessive burning and oxidation of the catalyst and to provide a carbon monoxide rich stream overhead from the regenerator section. The hydrocarbon decomposition reaction is highly endothermic so that sufficient heat must necessarily be transferred by the regenerated catalyst particles to maintain the reactor section temperature at a level adequate for an efficient conversion. Thus, sufficient air or oxygen is charged to the regenerator section to produce sufficient carbon oxides to in turn effect sufficient production of heat that will raise the catalyst particles to a level which will sustain conversion in the system. The carbon level on the catalyst particles may be controlled by the type of oxidation taking place, i.e., with a control of the carbon monoxide to carbon dioxide ratio in the regenerator. Also, a higher heat release may be obtained in the regenerator with increased carbon oxidation to carbon dioxide while a decreased heat release is obtained by burning carbon to carbon monoxide. With minimum air or oxygen addition, the carbon level control may be maintained by recycling a portion of the flue gas stream to utilize carbon dioxide to burn carbon to carbon monoxide in accordance with the reaction:

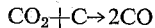
$$CO_2 + C \rightarrow 2CO$$

whereby the heat production is substantially lessened in the regeneration section.

A preferred arrangement of the system provides that the upper end of the regeneration section 19 and the particle separation zone 23 be superposed with respect to the stripper section 7 and the upper end of the reactor 1. Thus, the gravity flow of hot catalyst particles is utilized to maintain the continuously moving bed system through the stripper section, the reactor section and the return of particles to the lower end of the regenerator section.

In FIGURE 2 of the drawing, there is indicated a modified design and arrangement of the upper end portion of the reactor section, with a stripping section 25 being constructed externally of the upper portion of a vertically elongated reactor section 26. The operation of the modified arrangement is, of course, similar to that shown in FIGURE 1 in that hot regenerated catalyst particles descend from a transfer line 9′ to the stripper section 25 for multiple stage contact with a rising hydrogen rich stripping stream, obtained as a portion of the product stream. The catalyst descends over a plurality of side to side plates 27 to result in the discharge of reduced and stripped catalyst stream entering the upper end portion of reactor 26. In a preferred form of the latter, the particles contact the rising reactant stream in multiple stages by virtue of vertically spaced open grid members 28 so as to effect a desired efficient conversion of the hydrocarbon stream to hydrogen and carbon. Also, as in connection with FIGURE 1, the hydrogen rich product stream is indicated as passing overhead from the reactor 26 to a transfer line 12′ and to particle separator 13′ whereby particles may return through line 15′ to the reactor section and a particle free stream passes overhead by way of line 14′. A hydrogen rich stripping stream with entrained carbon oxides is separately discharged overhead from the stripping section 27 by way of outlet line 11′. The outlet of stripping section 27 may also be provided with a solids separator means similar to 13 and 23, but usually such means is not required due to the relatively small quantity of gas flowing upwardly through the stripper zone.

It is not intended to limit the present improved system to any one given design or configuration for the stripping sections or reactor sections; however, it is a particular feature of the present improved design to utilize means providing open communication between the lower end of the section and upper end of the reactor section such that a portion of the hydrogen rich product stream from the latter section is permitted to rise through the stripper section countercurrently to a descending flow of catalyst particles. Further, it is not intended to limit the present improved design and flow system to any one type of internal grid or side to side plates for assisting in the multiple stage redistribution of particles and rising reactant stream, particularly since it is recognized that various standard forms of perforate members, gratings, grids or side to side plate arrangements may be effectively used for redistribution purposes. Standard forms of particle separators may be utilized in the unit and such separators may be positioned externally of the contacting sections, as shown, or alternatively, may be positioned internally within enlarged disengaging sections as have internal diplets.

Refractory catalyst base materials which may be used are alumina, silica-alumina, or silica-magnesia, with an oxide of zirconium, titanium, and the like, or alternatively, one or more of the foregoing oxides with an oxide of chromium, molybdenum, vanadium, etc. Preferably one or more metals or metal oxides of Group VIII of the Periodic Table are utilized to provide optimum hydrogen formation. Thus, nickel, iron or cobalt compounds are advantageously used with a refractory base material, such as silica-alumina. Also, in view of the catalytic effect necessary in the regeneration zone to control heat release and the carbon monoxide to carbon dioxide ratio gasifying carbon from the catalyst particles, the catalyst is necessarily of a type which resists oxidation by carbon dioxide and is readily reducible. The size of the catalyst particles will vary in accordance with the conversion system used, but for a fluidized operation the particle size will generally be between 0.01 and 0.8 millimeter in diameter such that the particles may be readily fluidized and passed from one zone to another.

We claim as our invention:

1. A continuous method for converting a hydrocarbon stream into hydrogen and carbon in the presence of subdivided catalyst particles, which comprises, introducing heated and stripped catalyst particles to the upper portion of a vertically elongated reaction zone and passing such particles downwardly therethrough countercurrently to a hydrocarbon charge stream being introduced to the lower end of such zone at decomposition conditions effecting the production of a hydrogen containing stream and carbonized particles, passing resulting carbon containing particles to the lower end of a regeneration zone and contacting them in a rising fluidized column with a regeneration stream containing free oxygen in a controlled quantity whereby to effect the burning and removal of at least a portion of the carbon content on such particles, discharging resulting heated particles and flue gas from the upper end of said regeneration zone into a separating zone and therein effecting the separation thereof at an elevation above said reaction zone, passing separated particles by gravity flow downwardly through a stripping zone countercurrently to a stripping stream comprising a portion of the hydrogen containing product stream rising from said reaction zone whereby to effect the removal of carbon oxides from such particles, subsequently passing stripped catalyst particles downwardly in further gravity flow from the lower end of said stripping zone to the upper portion of said reaction zone which is in open communication with the lower end of the stripping zone for downward flow countercurrently through the hydrocarbon charge stream as aforesaid, separating the hydrogen containing product from the upper portion of the reaction zone into separate streams in a disengaging zone above the reaction zone, introducing one of the last-named streams into the lower end of the stripping zone as said stripping stream, and separately withdrawing hydrogen containing product streams from both the upper end of said disengaging zone and the upper end of said stripping zone.

2. A continuous method for converting a hydrocarbon stream into hydrogen and carbon in the presence of subdivided catalyst particles which comprises, introducing heated and stripped catalyst particles to the upper portion of a vertically elongated multiple stage reaction zone and passing such particles downwardly therethrough at decomposition conditions and countercurrently to a normally gaseous hydrocarbon charge stream being introduced to the lower end of such zone and effecting the production of hydrogen and carbonized particles, redistributing the catalyst particles and the gaseous hydrocarbon stream at spaced elevations in the reaction zone, passing resulting carbon containing particles to the lower end of a regeneration zone and contacting them in a rising fluidized column with a regeneration stream containing free oxygen in a controlled quantity whereby to effect and control the burning and removal of the carbon content of such particles and composition of the effluent gas and heat generated in the regenerator, discharging resulting heated particles and a controlled flue gas stream from the upper end of said regeneration zone into a separating zone and therein effecting the separation thereof at an elevation above said reaction zone, passing separated particles by gravity flow downwardly through a stripping zone countercurrently to a stripping stream comprising a portion of hydrogen containing product stream rising from said reaction zone whereby to effect the removal of carbon oxides from such particles and the reduction thereof, subsequently passing stripped and reduced particles downwardly in further gravity flow from the lower end of said stripping zone to the upper portion of said reaction zone which in open communication with the lower end of the stripping zone for downward flow in multiple stages countercurrently through the hydrocarbon charge stream as aforesaid, separating the hydrogen rich product from the upper portion of the reaction zone into separate streams in a disengaging zone above the reaction zone, introducing one of the last-named streams into the lower end of the stripping zone as said stripping stream, and separately withdrawing hydrogen containing product streams from both the upper end of said disengaging zone and the upper end of said stripping zone.

References Cited by the Examiner
UNITED STATES PATENTS

| | | | |
|---|---|---|---|
| 2,200,607 | 5/1940 | Stryker | 23—212 |
| 2,448,290 | 8/1948 | Atwell | 23—212 |
| 2,626,857 | 1/1953 | Crowley | 23—288.3 |
| 2,671,721 | 3/1954 | Gilliland | 23—212 X |
| 2,965,454 | 12/1960 | Harper | 23—288.3 |
| 3,017,250 | 1/1962 | Watkins | 23—212 X |
| 3,149,924 | 9/1964 | Cross | 23—288.3 |
| 3,163,496 | 12/1964 | Jahnig et al. | 23—212 |
| 3,216,801 | 11/1965 | Hoekstra | 23—212 |

OSCAR R. VERTIZ, *Primary Examiner.*

BENJAMIN HENKIN, *Examiner.*

B. H. LEVENSON, *Assistant Examiner.*